US009734946B2

(12) United States Patent
Yin et al.

(10) Patent No.: US 9,734,946 B2
(45) Date of Patent: Aug. 15, 2017

(54) SUPERPARAMAGNETIC COLLOIDS WITH ENHANCED CHARGE STABILITY FOR HIGH QUALITY MAGNETICALLY TUNABLE PHOTONIC STRUCTURES

(71) Applicant: The Regents of the University of California, Oakland, CA (US)

(72) Inventors: Yadong Yin, Riverside, CA (US); Yongxing Hu, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/357,251

(22) PCT Filed: Nov. 9, 2012

(86) PCT No.: PCT/US2012/064428
§ 371 (c)(1),
(2) Date: May 9, 2014

(87) PCT Pub. No.: WO2013/112224
PCT Pub. Date: Aug. 1, 2013

(65) Prior Publication Data
US 2014/0360973 A1 Dec. 11, 2014

Related U.S. Application Data

(60) Provisional application No. 61/557,810, filed on Nov. 9, 2011.

(51) Int. Cl.
*H01F 41/00* (2006.01)
*B01J 13/00* (2006.01)
(Continued)

(52) U.S. Cl.
CPC ........ *H01F 41/005* (2013.01); *B01J 13/0047* (2013.01); *B01J 13/14* (2013.01);
(Continued)

(58) Field of Classification Search
None
See application file for complete search history.

(56) References Cited

U.S. PATENT DOCUMENTS 4,793,980 A * 12/1988 Torobin ............... 423/213.5
5,055,194 A    10/1991 Goetz et al.
(Continued)

FOREIGN PATENT DOCUMENTS

CN    101694795 A    4/2010
DE    197 43 518 A1    4/1999
(Continued)

OTHER PUBLICATIONS

International Search Report (PCT/ISA/210) mailed on Aug. 29, 2013, by the Russian Patent Office as the International Searching Authority for International Application No. PCT/US2012/064428.
(Continued)

*Primary Examiner* — Duy Deo
(74) *Attorney, Agent, or Firm* — Buchanan Ingersoll & Rooney PC

(57) ABSTRACT

A method of stabilizing electromagnetically charged particles, which includes coating electromagnetically charged particles with a protective layer; and etching the protective layer to produce a porous protective layer on the electromagnetically charged.

20 Claims, 8 Drawing Sheets

(51) Int. Cl.
  *B01J 13/14* (2006.01)
  *B01J 13/20* (2006.01)
  *B82Y 20/00* (2011.01)
  *H01F 1/00* (2006.01)
  *H01F 1/44* (2006.01)
  *B82Y 40/00* (2011.01)
  *G02B 6/12* (2006.01)

(52) U.S. Cl.
  CPC .............. *B01J 13/20* (2013.01); *B82Y 20/00* (2013.01); *H01F 1/0018* (2013.01); *H01F 1/445* (2013.01); *B82Y 40/00* (2013.01); *G02B 2006/1213* (2013.01)

(56) References Cited

U.S. PATENT DOCUMENTS

| | | | |
|---|---|---|---|
| 6,255,477 | B1 | 7/2001 | Kleiber et al. |
| 6,562,568 | B1 | 5/2003 | Kleiber et al. |
| 2002/0098529 | A1 | 7/2002 | Tan et al. |
| 2003/0031783 | A1 | 2/2003 | Pryor et al. |
| 2004/0043216 | A1 | 3/2004 | Pryor et al. |
| 2005/0266429 | A1 | 12/2005 | Kleiber et al. |
| 2006/0228554 | A1 | 10/2006 | Tan et al. |
| 2007/0191497 | A1 | 8/2007 | Dransfield et al. |
| 2009/0053512 | A1* | 2/2009 | Pyun et al. .................. 428/336 |
| 2010/0148385 | A1 | 6/2010 | Balko et al. |

FOREIGN PATENT DOCUMENTS

| | | |
|---|---|---|
| EP | 1867993 A1 | 12/2007 |
| RU | 2271993 C2 | 3/2006 |
| WO | 98/31461 A1 | 7/1998 |

OTHER PUBLICATIONS

Zhen Liu et al., "The use of multifunctional magnetic mesoporous core/shell heteronanostructures in a biomolecule separation system", Biomaterials, Mar. 4, 2011, pp. 4683-4690, vol. 32, No. 21.

Database WPI, Week 201031, Thomson Scientific, London, GB; AN 2010-E61936, XP002739584.

Supplementary Partial European Search Report issued on May 27, 2015, by the European Patent Office in corresponding European Patent Application No. 12866433.1-1351 (8 pages).

Extended European Search Report issued Sep. 22, 2015 by the European Patent Office in corresponding European Patent Application No. 12 86 6433.1.

Ge, J., et al., "Assembly of Magnetically Tunable Photonic Crystals in Nonpolar Solvents", Journal of the American Chemical Society, vol. 131, No. 10, pp. 3484-3486, 2009.

Zhang, Q., et al., "Permeable Silica Shell through Surface-Protected Etching", Nano Letters, vol. 8, No. 9, pp. 2867-2871, 2008.

Hu, Y., et al., "Control Over the Permeation of Silica Nanoshells by Surface-Protected Etching with Water", Physical Chemistry Chemical Physics, vol. 12, No. 38, pp. 11836-11842, 2010.

Ge, J., et al., "Highly Tunable Superparamagnetic Colloidal Photonic Crystals", Angewandte Chemie International Edition, vol. 119, No. 39 pp. 7572-7575, 2007.

Ge, J., et al., "Superparamagnetic Magnetite Colloidal Nanocrystal Clusters" Angewandte Chemie International Edition, vol, 46, No. 23 pp. 4342-4345, 2007.

Office Action dated Jun. 16, 2017 by the European Patent Office in corresponding European Patent Application No. 12. 866 433.1.

\* cited by examiner

SUPERPARAMAGNETIC COLLOIDS WITH ENHANCED CHARGE STABILITY FOR HIGH QUALITY MAGNETICALLY TUNABLE PHOTONIC STRUCTURES

STATEMENT OF GOVERNMENT RIGHTS

This invention was made with Government support under Grant No. W911NF-10-1-0484, awarded by the Army Research Office (ARO). The US government has certain rights in the invention.

FIELD OF THE INVENTION

The present invention relates to superparamagnetic colloids with enhanced charge stability for high quality magnetically tunable photonic structures, and more particularly to a method and process of forming superparamagnetic colloids with enhanced charge stability for high quality magnetically tunable photonic structures.

BACKGROUND OF THE INVENTION

There are increasing opportunities and demands for photonic materials with properties that can be tuned by external stimuli. Colloidal assembly has become one of the most powerful routes for the fabrication of responsive photonic crystals because the stimulus-responsive materials can be incorporated into the colloidal building blocks through chemical synthesis, or they can be integrated into the photonic device during or after the assembly processes. For example, inclusion of superparamagnetic (SPM) components into colloidal building blocks allows for effective control over photonic properties of the assembled structures by using external magnetic fields. Recently, a series of magnetically tunable photonic crystal systems through the assembly of uniform superparamagnetic (SPM) colloidal particles in liquid media with various polarities has been demonstrated. One of the keys of this self-assembly strategy is the establishment of a balance between the magnetically induced dipolar attraction and the repulsions resulted from surface charge or other structural factors. This finely tuned dynamic equilibrium leads to the self-assembly of the magnetic colloids in the form of chain structures with defined internal periodicity along the direction of external field, and also renders the system a fast, fully reversible optical response across the visible-near-infrared range when the external magnetic field is manipulated. To balance the magnetic dipole attractions, a long-range strong repulsive force between SPM particles is demanded to achieve high quality responsive photonic structures in terms of enhancing the structure ordering, and broadening the tunability of interparticle distance and the corresponding diffraction colors. Strong electrostatic repulsions can be established among neighboring $Fe_3O_4$ particles by covering their surface with a layer of polyacrylate, a highly charged polyelectrolyte. However, gradual change of the photonic properties over time has been observed, mainly due to the partial detachment of polyacrylate molecules from the particle surface. This drift of photonic performance due to charge instability may limit many of their practical applications. The magnetic assembly process has also been extended to alkanol solvents by modifying iron oxide particle surface with a layer of silica, or nonpolar solvents after further surface modifications. However, although the stability was improved, the electrostatic repulsion as the counterforce to balance the magnetic attraction was diminished. Thus, the tuning range of the diffraction from these photonic assemblies was considerably narrower comparing with that from polyacrylate covered $Fe_3O_4$ particles in aqueous solutions.

Accordingly, to ensure a consistent photonic performance over a long period, it is highly desirable to develop methods to maintain a long-term stability of the strong charges on the superparamagnetic particle surface. Furthermore, it would be desirable to have a method and/or process that allow the instantaneous creation of high quality colloidal crystal structures with tailored photonic properties.

SUMMARY

In accordance with an exemplary embodiment, a method of stabilizing electromagnetically charged particles, comprises: coating electromagnetically charged particles with a protective layer; and etching the protective layer to produce a porous protective layer on the electromagnetically charged particles.

In accordance with another exemplary embodiment, the electromagnetically charged particles are superparamagnetic.

In accordance with a further exemplary embodiment, the porous protective layer has mesoscale porosity and enhanced permeability to solvents and ions.

In accordance with another exemplary embodiment, the porous protective layer prevents the polyelectrolyte from detaching from the superparamagnetic particles and allows the charge dissociation of polyelectrolyte and produce strong electrostatic interactions among the superparamagnetic particles; and wherein the porous protective layer enhances the charge stability and maintains long-range repulsions, which allows for self-assembly of the photonic structures with excellent optical properties and long-term stability.

In accordance with a further exemplary embodiment, the porous protective layer is polystyrene and/or poly(methyl methacrylate), silica, titania, zinc oxide and/or alumina.

In accordance with another exemplary embodiment, directly depositing the protection layer on the electromagnetically charged particle surface by directly depositing a layer of silica through a sol-gel process; and etching the layer of silica with a water-etching step.

In accordance with a further exemplary embodiment, the water-etching step produces mesopores and micropores within the layer of the silica, the mesopores comprise pores of greater than approximately 2 nm, and the micropores comprise pores of less than approximately 2 nm.

In accordance with another exemplary embodiment, etching the superparamagnetic particles in toluene and/or chloroform, which produces porosity on the surface of the superparamagnetic particles.

In accordance with a further exemplary embodiment, etching the coated particles in a base solution to produce mesoscale porosity in the silica layer; stabilizing the charges on the superparamagnetic (SPM) particles; and enhancing the electrostatic repulsion by facilitating the charge dissociation of polyelectrolytes underneath the protective layer to form a high density of negative charges.

In accordance with another exemplary embodiment, performing a post-treatment process, which removes materials from the protective layer to create porosity.

In accordance with a further exemplary embodiment, wherein the etching is a base/acid etching, salt etching, and/or solvent etching.

In accordance with another exemplary embodiment, synthesizing superparamagnetic particles in water and coating the particles with a layer of silica by a modified Stöber method; washing the coated superparamagnetic particles with ethanol and water to remove excess $NH_3 \cdot H_2O$; heating the superparamagnetic particles in distilled water; cleaning the superparamagnetic particles with water; and dispersing the superparamagnetic particles in distilled water.

In accordance with a further exemplary embodiment, controlling porosity of the porous protective layer on the superparamagnetic particles based on a duration of etch time.

In accordance with another exemplary embodiment, a method of stabilizing electromagnetically charged particles, comprises: coating surfaces of charged electromagnetically charged particles with a protective layer; and post-treating the surfaces of the electromagnetically charged particles to produce micropores and mesoscale pores within the protective layer.

In accordance with a further exemplary embodiment, wherein the electromagnetically charged particles are charged superparamagnetic particles.

In accordance with another exemplary embodiment, depositing the protecting layer on the superparamagnetic (SPM) particles through an emulsion polymerization, the emulsion polymerization includes depositing a slightly cross-linked polystyrene layer on the surfaces of the superparamagnetic particles.

In accordance with a further exemplary embodiment, wherein the micropores and mesoscale pores prevents the polyelectrolyte from detaching from the superparamagnetic particles and allows the polyelectrolyte to ionize and produce strong electrostatic interactions among the superparamagnetic particles; and the micropores and mesoscale pores enhance the charge stability and maintains long-range repulsions, which allows for self-assembly of the photonic structures with excellent optical properties and long-term stability.

In accordance with another exemplary embodiment, the protective layer is polystyrene and/or poly(methyl methacrylate), silica, titania, zinc oxide and/or alumina.

In accordance with a further exemplary embodiment, directly depositing the protective layer on the charged superparamagnetic particle surface by directly depositing a layer of silica through a sol-gel process; and etching the layer of silica with a water-etching step, wherein the water-etching step produces the micropores and mesopores within the layer of the silica.

In accordance with another exemplary embodiment, the mesoscale pores within the layer of silica comprises pores of greater than approximately 2 nm, and the micropores have a diameter of less than approximately 2 nm.

BRIEF DESCRIPTION OF THE DRAWINGS

The exemplary embodiments of the disclosed systems and methods can be better understood with reference to the following drawings and description. The components in the figures are not necessarily to scale, emphasis instead being placed upon illustrating the principles of exemplary embodiments of the disclosed system. Moreover, in the figures, like reference numerals designate corresponding parts through the different views.

DETAILED DESCRIPTION

Figure 1:
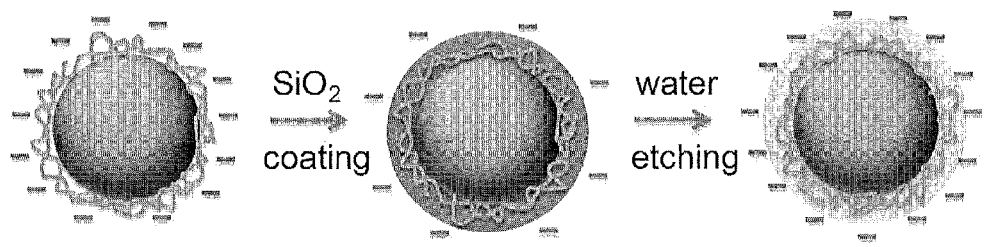
FIG. 1 is a schematic illustration showing the strategy for stabilizing high density negative charges on the surface of superparamagnetic $Fe_3O_4$ colloidal particles, and wherein a layer of porous silica is created to prevent the polyacrylate chains from detaching from the $Fe_3O_4$ particle surface.

In accordance with an exemplary embodiment, a process to address the above-mentioned disadvantages has been developed, which includes coating the charged superparamagnetic (SPM) particles with a porous protecting layer, which prevents the polyelectrolyte from detaching from the particles and at the same time allows the polyelectrolyte to ionize and produce strong electrostatic interactions among particles. For example, this process makes it possible to enhance the charge stability and maintain the long-range repulsion, allowing for the self-assembly of photonic structures with excellent optical properties and long-term stability. In accordance with an exemplary embodiment, the protecting layer can be polymers including but not limited to polystyrene, poly(methyl methacrylate), inorganic materials including but not limited to silica, titania, zinc oxide or alumina.

The coating of a porous protecting layer can be realized using a number of different approaches. In accordance with an exemplary embodiment, a porous layer is directly deposited to the charged SPM particle surface. For example, a thin layer of silica, which contains micropores can be directly deposited to the SPM particles through controlled sol-gel process. In accordance with another exemplary embodiment, the surface-charged SPM particles are coated with a layer of solid protecting layer, which are then post-treated to produce additional micropores and mesopores. In one example, a slightly cross-linked polystyrene layer can be deposited on the SPM particle surface through emulsion polymerization. The particles are then subjected to etching in solvent such as toluene and chloroform to produce porosity on the surface. In another example, a layer of silica is deposited to the charged SPM particle surface through sol-gel process. The coated particles are then etched in a base solution to produce porosity in the silica layer. In accordance with an exemplary embodiment, the process stabilizes the charges on the SPM particles and subsequently enhances the electrostatic repulsion by facilitating the charge separation of polyelectrolytes (such as the salt of polyacrylic acid, polyalkylamine) underneath the protective layer to form high density of negative charges.

In accordance with an exemplary embodiment, the post-treatment processes are preferably processes that remove materials from the protecting layer to create porosity, including but not limited to base/acid etching, salt etching, and solvent etching methods. In an accordance with an exemplary embodiment, silica is chosen as the protecting layer due to its convenient sol-gel based coating procedure, low processing temperature, and the well-developed silylation chemistry for further surface functionalization. For example, etching in a base solution (*Nano Lett.*, 2008, 8, 2867) or in heated water (*Phys. Chem. Chem. Phys.*, 2010, 12, 11836) can effectively create controllable permeability within a thin layer of silica. Chemical etching partially breaks the imperfectly condensed silica network and forms soluble monosilicic acid, eventually producing mesoscale pores in the silica structures and additional hydroxyl groups in the porous shell. The resulted porous structure allows water molecules and hydrated ions diffuse in/out to accelerate the ionization of polyelectrolyte beneath the silica layer while the additional hydroxyl groups provide extra negative charges in the porous silica networks. The post-treatment process renders the colloids' surface a layer of relative higher density of negative charges than that of the original SPM colloids. The stronger electrostatic repulsions between the particles allow the self-assembly of magnetite particle into more ordered structures in solution, resulting in broader tuning range and higher diffraction intensities. By taking advantage of the unique features of the post-treatment strategy, the protected polyelectrolyte assures the long-term stability of the modified high quality photonic structures.

In accordance with an exemplary embodiment, a method and/or process for assembling superparamagnetic colloids with enhanced charge stability for high quality magnetically tunable photonic structures have been developed by adding a protecting layer of porous silica (p-$SiO_2$) that can prevent the polyelectrolyte from detaching from the $Fe_3O_4$ particle surface and at the same time allow the polyelectrolyte to ionize and maintain the strong electrostatic interactions. As shown schematically in FIG. 1, the porous protecting layer can be achieved by coating the polyacrylate-capped $Fe_3O_4$ particles with a layer of solid silica through a typical sol-gel coating process, followed by a mild water etching step to produce mesoscale porosity and enhance the permeability of the silica layer. The porous silica layer stabilizes the polyacrylate chains in its network and allows their charge dissociation. As a result, this process effectively enhances the charge stability and maintains the long-range electrostatic repulsion, producing magnetically tunable photonic structures with consistent performance even after a long period of storage.

Figure 2:
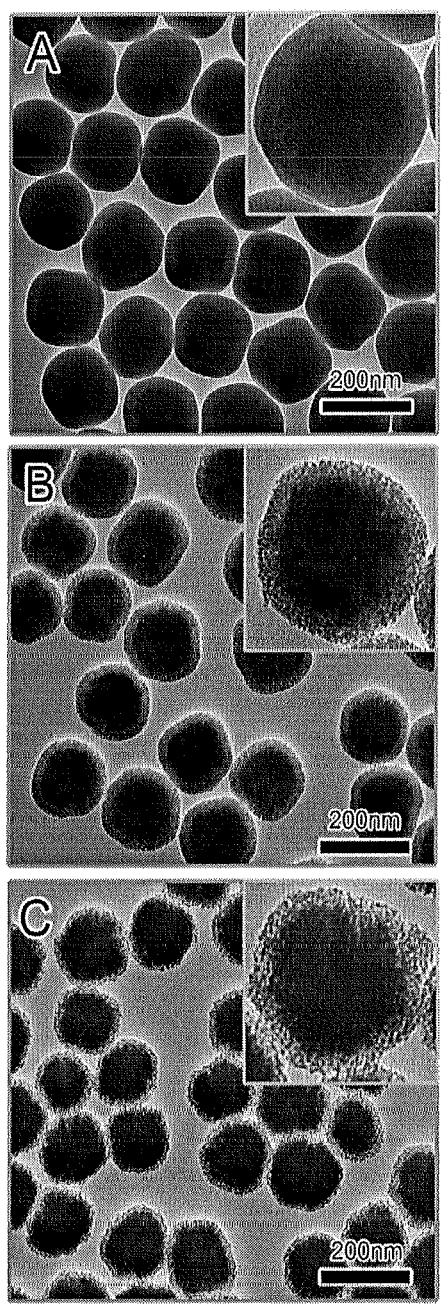
FIG. 2 are Transmission Electron Microscopy (TEM) images of $Fe_3O_4/SiO_2$ etched with water for A) 0 min, B) 20 min, C) 60 min, and wherein insets are corresponding high magnification images showing the increased pore sizes of the silica layer during etching.

In accordance with an exemplary embodiment, mild etching in hot water bath can effectively create controllable permeability within the silica layer. The Transmission Electron Microscopy (TEM) images in FIG. 2 demonstrate the evolution of the porosity in the silica layer during the etching process. The initial silica coating leads to a core-shell structure that can be appreciated by the contrast between the layers in the brightfield image in FIG. 2A. After a post treatment of the $Fe_3O_4/SiO_2$ colloids in water at around 95° C. for 20 minutes, the size and shape of the colloids remain nearly unchanged (FIG. 2B). The major change lies in the lower contrast of the shell in the etched samples, as shown in FIG. 2B inset at a higher magnification, which clearly suggests a porous structure in the $SiO_2$ layer. It is known that the typical sol-gel process produces amorphous silica with highly discontinuous Si—O—Si networks, which can be partially destroyed by water when heated at an elevated temperature by forming soluble monosilicic acid, eventually producing mesoscale pores covered with additional hydroxyl groups. For example, benefiting from the mild etchant of water, a larger portion of $SiO_2$ can be dissolved in a well-controlled manner by extending the etching period, resulting in bigger pores with size of a few nanometers. As shown in FIG. 2C, after etching for 60 minutes, the shell shows enlarged pores and a noticeably lower contrast in TEM imaging (FIG. 2C inset). In addition, the thickness of the $SiO_2$ shell decreases slightly when the outer shell is subjected to excessive etching, resulting in a decreased overall size of the colloids. Comparing with the alkaline-based surface-protected etching process previously developed, the water-based etching strategy is milder and easier to control.

The porous protective layer on the iron oxide particle surface accelerates the charge dissociation of embedded PAA (Polyacrylic acid) by enhancing the diffusion of water molecules and hydrated ions in/out of the shell. The conventional base-catalyzed sol-gel route typically leads to the formation of micropores with size below 1 nm inside the amorphous silica. As a result, the dissociation of polyelectrolyte is limited owing to the lower effective diffusion rates of water molecules and hydrated ions restricted by the pore. In accordance with an exemplary embodiment, experimental and simulation studies show that water molecules confined in nanoscale geometries exhibit strong water-silica hydrogen bonding when the hydroxylated silica surfaces are in small separation, typically less than approximately 1 nm apart, thus greatly limiting their diffusion. Accordingly, the hydrated counterions are bounded to the silica micropore surface in complete registry, which also makes their diffusion out of the silica shell difficult. However, for enlarged pores (greater than approximately 1 nm), bulk-like regions of free water start to present, allowing improved diffusion of hydrated counterions and more effective charge dissociation of the PAA ligands.

Figure 3:
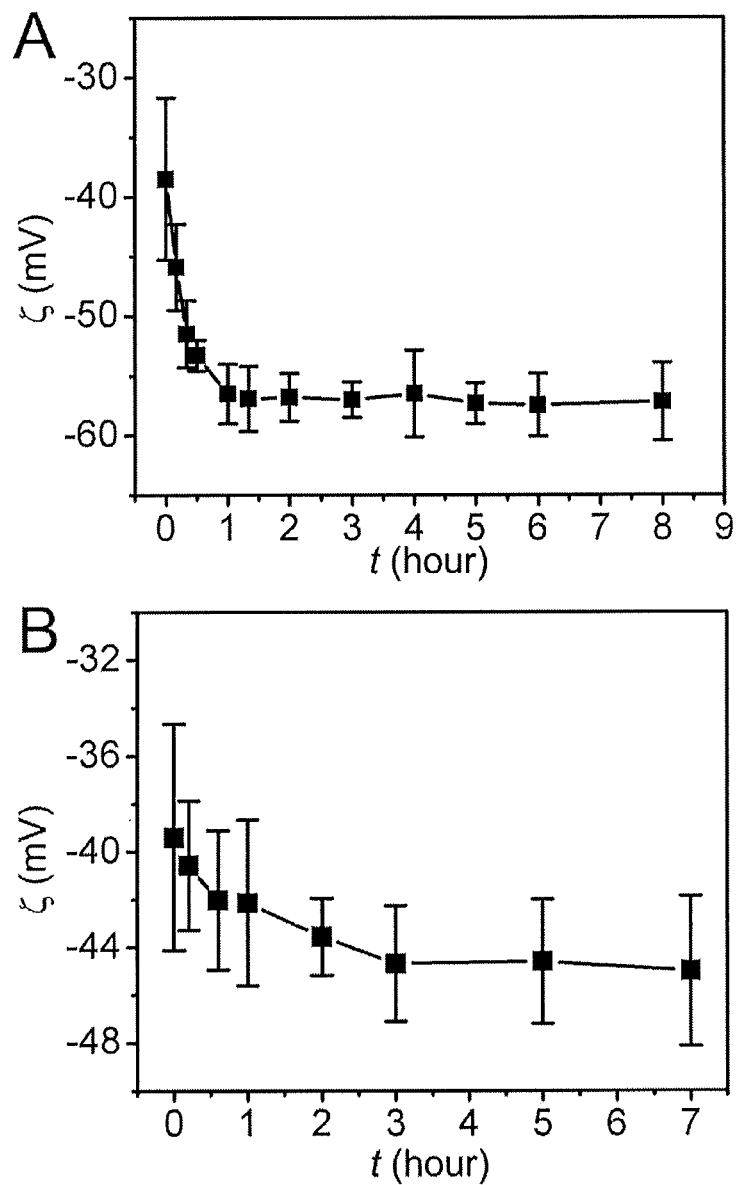
FIG. 3 is a chart showing the change of $\zeta$ potential during the water-based etching of A) $Fe_3O_4/SiO_2$ and B) pure $SiO_2$ spheres.

In accordance with an exemplary embodiment, the change of the $\zeta$ potential during the etching process of the silica layer was monitored to demonstrate the enhanced surface charge of the $Fe_3O_4$/p-$SiO_2$ colloids (FIG. 3A). Before etching, the silica-coated $Fe_3O_4$ colloids displayed a $\zeta$ potential of approximately −38.5 mV, suggesting a high density of silanol groups on the surface after the sol-gel based coating process. For example, this value was consistent with that measured for silica colloids freshly prepared through sol-gel processes. However, this was much lower than the average value of approximately −49.0 mV measured for PAA-covered $Fe_3O_4$ particles, indicating only partial dissociated of the embedded PAA ligands. At the initial stage of water etching for approximately 60 minutes, the $\zeta$ potential rapidly increased to approximately −56.5 mV, and then stayed almost constant at that value upon continued etching.

In accordance with an exemplary embodiment, the improved surface charge gained by the etched samples is believed to be due to not only the enhanced charge dissociation of embedded PAA, but also the formation of additional hydroxyl groups during the breakdown of Si—O—Si networks. For example, this has been verified by monitoring the ζ potential variation during the water-based etching of similarly sized pure $SiO_2$ solid particles prepared by the sol-gel process, which also shows a change from approximately −39.4 to −45.0 mV after etching for 7 hours (FIG. 3B). The difference of the ζ potential change between the etched $Fe_3O_4$/p-$SiO_2$ particles and etched $SiO_2$ solid spheres should be attributed to the improved charge dissociation of PAA in the more porous silica networks.

Figure 4:
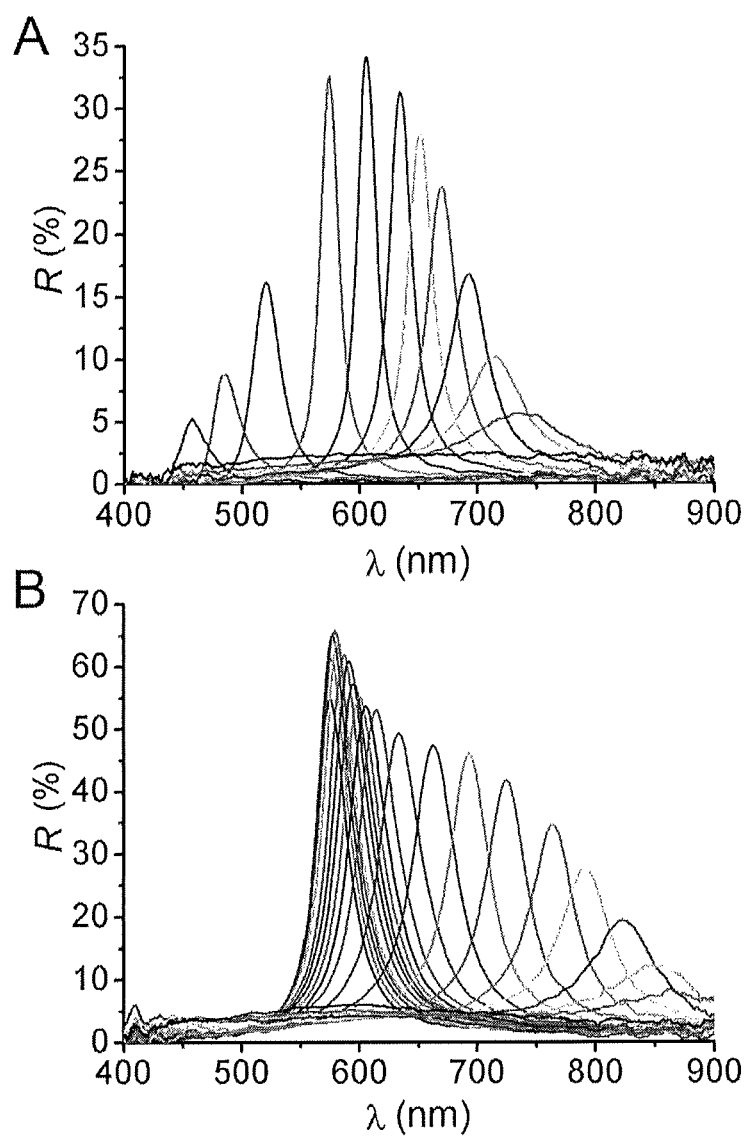
FIG. 4 is a chart showing the reflectance spectra of: A) $Fe_3O_4$ particle aqueous solution and B) $Fe_3O_4/p\text{-}SiO_2$ aqueous solution in response to an external magnetic field with varying strength, achieved by changing the magnet-sample distance, and wherein the diffraction peak blue-shifts as the distance decreases from 4.8 to 3.9 cm for (A) and 3.8 to 0 cm for (B), with step size of 0.2 cm.
Figure 5:
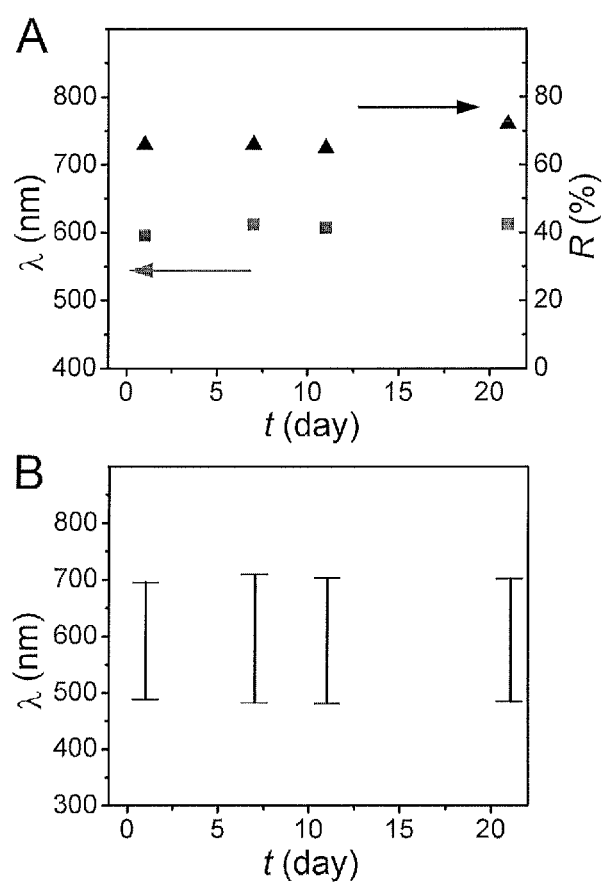
FIG. 5 is a chart showing: A) The change in peak position (square) and diffraction intensity (triangle) of a $Fe_3O_4/p\text{-}SiO_2$ aqueous solution in response to a magnetic field with a defined strength of approximately 131 G after the particles have been stored in water for various time periods, and B) the tuning range of the diffraction peaks after storing a sample of $Fe_3O_4/p\text{-}SiO_2$ particles for different periods of time.

The enhanced negatively charged surface renders the $Fe_3O_4$/p-$SiO_2$ colloids stronger interparticle repulsion which benefits their assembly under external magnetic fields into periodic structures with tunable photonic properties. In principle, for example, when a stronger magnetic field is applied to balance the increased electrostatic repulsion, the magnetic particles are organized with improved long-range order and therefore increased diffraction intensity. FIG. 4 compares the typical reflection spectra of an aqueous solution of 128 nm $Fe_3O_4$ particles and an aqueous solution of 131 nm (overall diameter, with 106 nm core size and 12.5 nm shell thickness) $Fe_3O_4$/p-$SiO_2$ particles as a function of the external magnetic field strength. For $Fe_3O_4$ particles in water, the reflection spectra present a typical symmetric profile (FIG. 4A): the intensity of the diffraction peak first increases, and then decreases after reaching the maximum as the magnetic field increases gradually. Simultaneously, the diffraction peaks shift to shorter wavelengths at the same time. However, for an aqueous solution of $Fe_3O_4$/p-$SiO_2$ particles, the diffraction intensity increases steadily with increasing external field strength until reaching a saturation value. For example, further increasing the strength of the magnetic field does not significantly change the peak position and the peak intensity, indicating a strong electrostatic repulsive force with a fixed average interparticle spacing (FIG. 4B). The contour of the peaks therefore shows a skewed profile, which is similar with that of $Fe_3O_4$/$SiO_2$ ethanol system. The contribution from "solvation force" in the repulsions can be ignored in $Fe_3O_4$/p-$SiO_2$ aqueous system because the solvation layers of two nearby particles cannot overlap in a relative larger interparticle separation. In addition, the diffraction intensities are much higher in $Fe_3O_4$/p-$SiO_2$ aqueous system than that in bare aqueous $Fe_3O_4$ system or $Fe_3O_4$/$SiO_2$ ethanol system, resulting from the significantly enhanced charge density on the particles' surface.

The distinct optical responses to various magnetic field strength in ordering $Fe_3O_4$/p-$SiO_2$ in water and $Fe_3O_4$ in water can be due to the differences between the strength of the electro-repulsive forces involved in the two cases. In aqueous systems, for both charged $Fe_3O_4$/p-$SiO_2$ and $Fe_3O_4$ particles, the electrostatic force dominates the particle interactions and determines the periodicity of the assembled structures by countering the induced magnetic attraction, based on Derjaguin-Landau-Verwey-Overbeek (DLVO) theory. The long-range electrostatic repulsion allows the particles to assemble at a large separation distance (ca. 144 nm for $Fe_3O_4$ and ca. 193 nm for $Fe_3O_4$/p-$SiO_2$), keeping the adjacent particles in "soft contact" with each other. For the $Fe_3O_4$ aqueous dispersions, the packing force is the main factor of disturbing the long-range order inside the particle chains and diminishing the diffracted intensity within several minutes when the magnet-sample distance is small enough. For the $Fe_3O_4$/p-$SiO_2$ aqueous dispersions, the significantly increased high surface charge density can lead to stronger repulsive interactions together with an increase of the interparticle distance in a magnetic field with fixed strength, therefore red-shifting the diffraction peak at low magnetic field strength. While the strength of magnetic field increases, the enhanced electrostatic force can still dominate the interparticle repulsions at smaller separations, making it capable of countering the induced magnetic attractive dipole force and packing force. The resulting balance between the stronger magnetic attractions and the increased electrostatic repulsions assemble the particles into improved ordered structures with higher diffraction intensity. Moving the magnet even closer (ca. 0 mm) can effectively increase the magnetic packing force, but the ordered assembly of the particles ($D_{s-s}$=86 nm) can be kept against coagulation and precipitation in dispersion within a period of tens of minutes. By taking advantages of the significantly enhanced surface charge density, the increased repulsive forces render the $Fe_3O_4$/p-$SiO_2$ aqueous system greatly improved diffraction intensities and tuning range of the diffraction to the changes in the strength of magnetic field.

Figure 6:
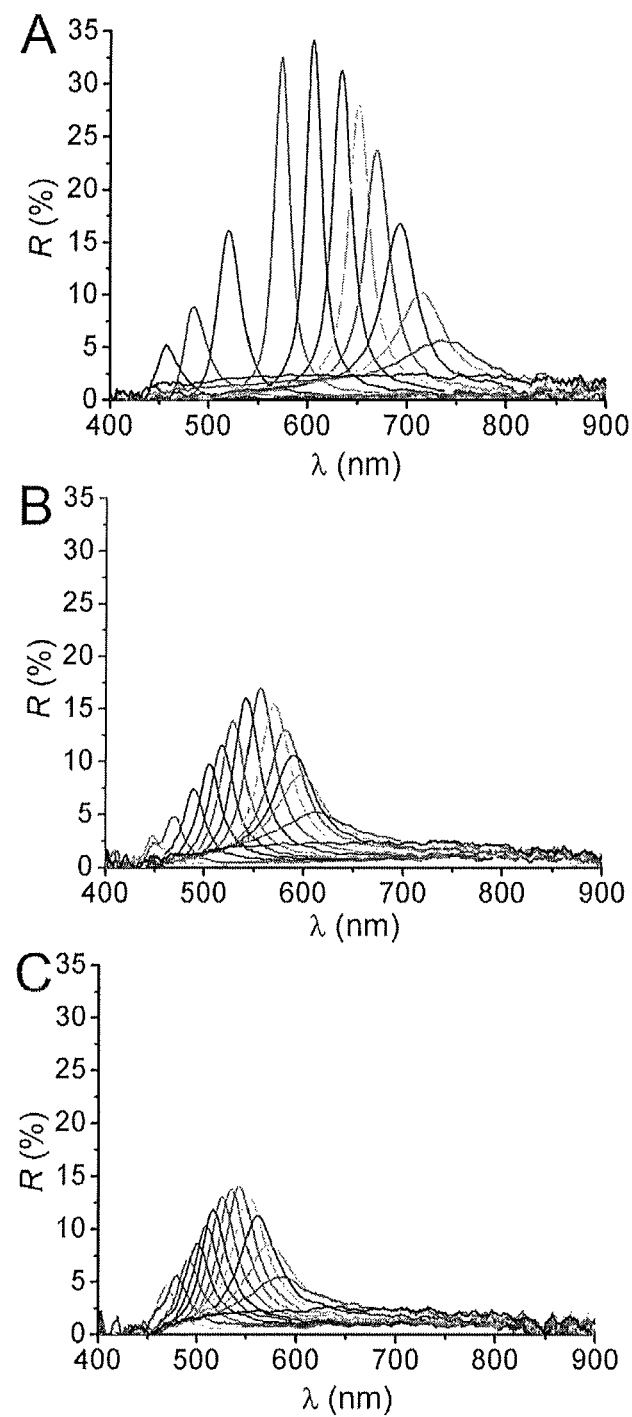
FIG. 6 is a chart showing reflection spectra of $Fe_3O_4$ particle aqueous solution in response to an external magnetic field with varying strength, achieved by changing the magnet-sample distance, after preparation for: A) 1 day; B) 2 days; and C) 4 days.
Figure 7:
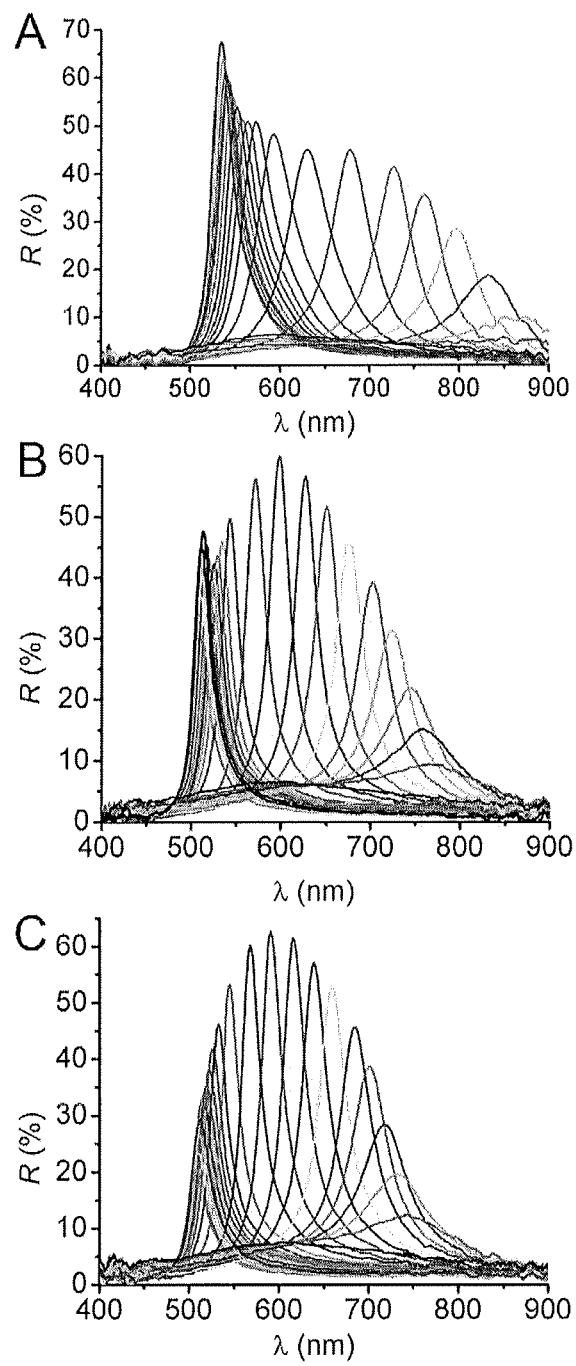
FIG. 7 is a chart showing the reflection spectra of $Fe_3O_4/p\text{-}SiO_2$ aqueous solution in response to an external magnetic field with varying strength, achieved by changing the magnet-sample distance, after preparation for: A) 1 day; B) 2 days; and C) 3 days.

The long-term stability of the magnetically tunable photonic crystal system has been remarkably improved, resulting from the stabilization of the repulsive forces by a layer of porous protecting silica shell. For example, in a previous aqueous $Fe_3O_4$ system, the stability against long-term storage suffers from the polyelectrolyte detachment and the ionic strength variation induced by dissolution of extra ions from the storage vial. As a result, the diffraction peaks greatly blue shift and the tuning range of peak position shrink a lot. The diffraction intensity decreases monotonically and fades away in storage of approximately 3 days (FIG. 6). In accordance with an exemplary embodiment, to demonstrate the long term stability of the designed system, the optical performance of the prepared $Fe_3O_4$/p-$SiO_2$ aqueous dispersions was monitored by reflection spectra over 3 weeks. FIG. 7 shows the variation of magnetically induced reflection spectra of a $Fe_3O_4$/p-$SiO_2$ with storage time. For example, generally, the system needs a short period of time to reach a stabilized stage right after it is post-treated with water-based etching. During the initial 3 days, at a fixed low magnetic strength, the diffraction peaks consistently blue-shifted with an increased storage time. It indicates a mild decrease of repulsive electrostatic interactions as the hydroxyl groups in the porous silica framework continue with condensation, gradually reducing the negative charges from silica layer. The slight decrease of charge density on the particles can also be proven by the decreased diffraction intensities at short wavelength when strong magnetic fields with high gradient are applied. However, for example, the overall performance in weaker magnetic fields keeps the same because the negative charges from the ionization of polyelectrolyte are relatively stable. For example, the diminishment of the hydroxyl groups on porous silica layer can lead to a gradual evolution from a skewed diffraction profile to a symmetric profile. The resulting symmetric diffraction profile is similar with that of a PAA coated $Fe_3O_4$ aqueous system, indicating the effective negative charges are from ionization of polyelectrolyte underneath the porous shell once it is stabilized after condensation.

Figure 8:
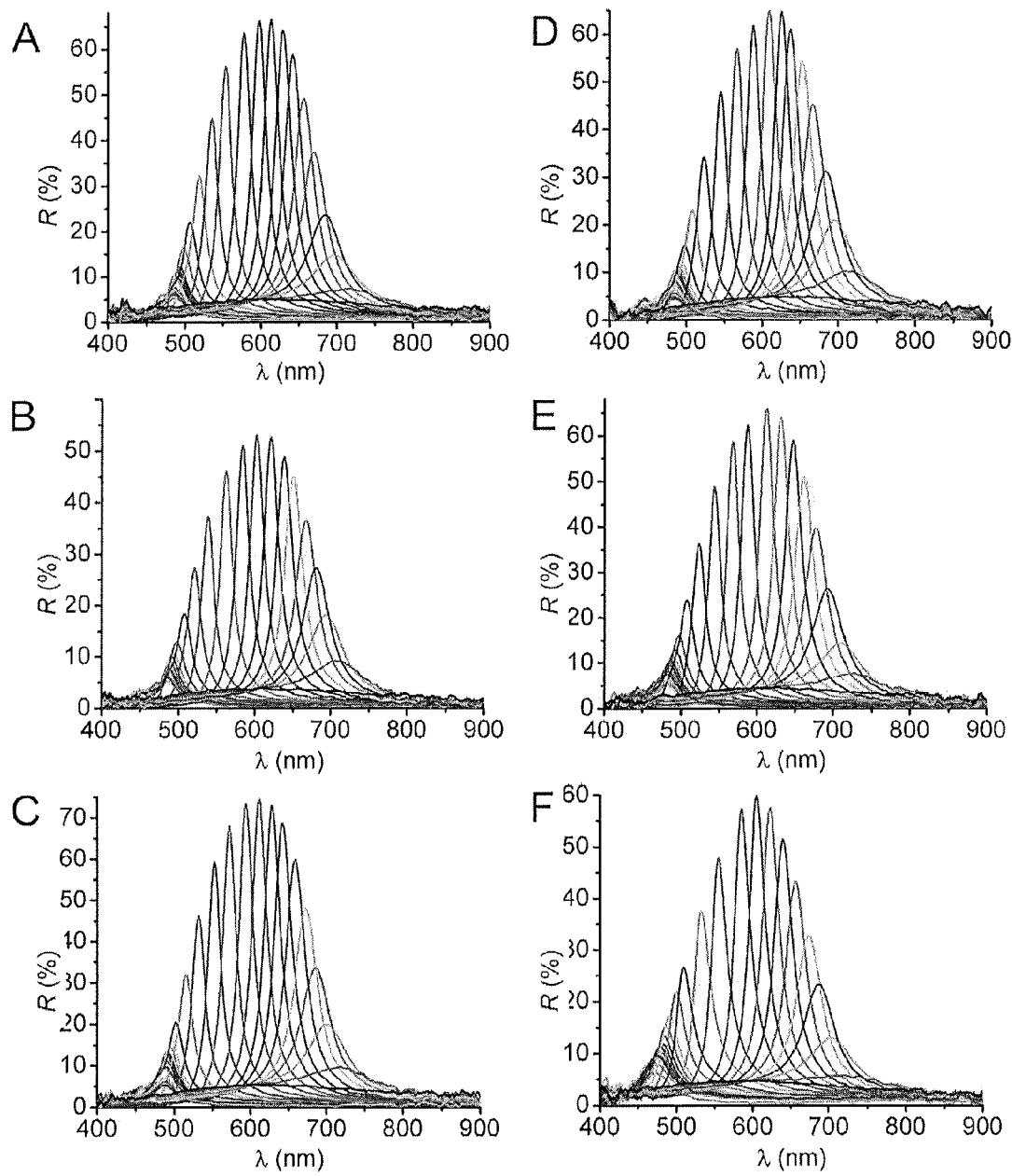
FIG. 8 is a chart showing the reflection spectra of $Fe_3O_4/p\text{-}SiO_2$ aqueous solution in response to an external magnetic field with varying strength after preparation for: A) 4 day; B) 6 days; C) 10 days; D) 14 days; E) 18 days; and F) 24 days.

After an initial stabilization period, the photonic performance becomes very stable without peak shift and intensity variation. FIG. 8 summarizes the change in peak position and diffraction intensity of a cleaned $Fe_3O_4$/p-$SiO_2$ solution with varying storage time at fixed magnetic field strength of approximately 131 G. During the storage, the peak position kept almost the same at 605 nm with slight fluctuations in diffraction intensity, which can be ascribed to the instrument errors. The diffraction intensity reached as high as more than 60%, which was relatively hard to achieve in $Fe_3O_4$ aqueous system. For example, the tuning ranges of the diffraction peak did not change too much over 3 weeks but kept in the range from 700 nm to 480 nm. The steady photonic performance of this system indicates the stability of the charges on the surface of $Fe_3O_4$/p-$SiO_2$ from the ionization of polyelectrolyte. All the results demonstrate the successful protection of the ionized polyelectrolyte by the porous silica shell, which helps enhance the long-term stability of the photonic properties.

In accordance with an exemplary embodiment, a two-step process is disclosed, which fabricates high quality magnetically tunable photonic structures with long-term stability. The process includes stabilizing the charges on $Fe_3O_4$ particles by modifying the surface with a porous protecting silica layer to prevent the detachment of PAA from $Fe_3O_4$ surface, which caused the charge instability in the original $Fe_3O_4$ aqueous system. Meanwhile, the porous structure of the silica shell in $Fe_3O_4$@p-$SiO_2$ allows the charge dissociation of polyelectrolyte underneath it. Both the ionization of Polyelectrolyte and the addition of hydroxyl group on the porous silica framework contribute to the increase of negative charges on the $Fe_3O_4$/p-$SiO_2$ particles, making them the ideal building blocks to create high quality magnetically responsive photonic crystals with widely and reversibly tunable structural colors, enhanced diffraction intensity and long term stability. The enhanced electrostatic repulsive forces also stabilize the dynamic chaining structures against aggregation induced by magnetic packing force in a magnetic field with high gradient. The process and system as disclosed herein shows important features such as high stability, a fast, reversible, and tunable optical response to external magnetic fields. For example, the ability to stabilize the photonic performance allows the practical applications in displays or sensors. In addition, the porous silica surface can be further modified with a large variety of functional groups through silane chemistry to further broaden the application.

EXPERIMENTAL

A. Materials

Ethanol (denatured), anhydrous iron(III) chloride ($FeCl_3$), ammonium hydroxide solution (Fluka), tetraethyl orthosilicate (TEOS, 98%, Acros Organics) and sodium hydroxide (NaOH) were purchased from Fisher Scientific. Polyacrylic acid (PAA, MW=1800) and Diethylene glycol (DEG) were obtained from Sigma-Aldrich. Distilled water was used throughout all the experiments. All chemicals were used as received without further treatment.

B. Synthesis

Synthesis of $Fe_3O_4$/$SiO_2$ Core/Shell Colloids

Superparamagnetic iron oxide nanocrystal clusters (approximately 130 nm in diameter) in water were synthesized according to a high-temperature hydrolysis reaction reported previously. $Fe_3O_4$@$SiO_2$ core/shell colloids were prepared through a modified Stöber process. In accordance with an exemplary embodiment, an aqueous solution (3 mL) containing $Fe_3O_4$ particles (ca. 25 mg) was mixed with ammonium hydroxide (28%, 1 mL) aqueous solution and sonicated for 3 minutes. Ethyl alcohol (20 mL) was then added into the mixture under strong sonication, which was further sonicated for 5 minutes. TEOS (120 μL) was injected to the solution after it was transferred into a 100 mL flask with vigorous stirring using mechanical stirrer. After 20 min, the $Fe_3O_4$/$SiO_2$ core/shell colloids were collected by centrifugation, washed with ethanol and water two times respectively and finally dispersed in distilled water (20 mL).

Synthesis of $Fe_3O_4$/p-$SiO_2$ Core/Shell Colloids $Fe_3O_4$/$SiO_2$ colloids in 20 mL distilled water were aged for 24 hours before treated with boiling water. First, the $Fe_3O_4$/$SiO_2$ colloidal solution was transferred to a 100 mL three-neck flask under magnetic stirring at 800 rpm after it was sonicated for 5 min. Then the solution was heated to and kept at approximately 95° C. while reflux water was running to keep water from evaporation throughout the boiling process. Heating was stopped when the color of the solution started to turn from dark brown to brown-yellowish. The $Fe_3O_4$/p-$SiO_2$ core/shell colloids were cleaned several times with distilled water, and finally dispersed in distilled water (3 mL).

The morphology of the obtained products was characterized using a Tecnai T12 transmission electron microscope (TEM). The TEM samples were prepared by transferring one drop of sample dispersion in water onto a carbon-coated copper grid and then drying in air. Zeta potentials were measured by a Brookhaven Instruments Zeta Potential Analyzer at a scattering angle of 90° and a temperature of 25° C. The UV-Vis spectra were measured by a probe-type Ocean Optics HR2000CG-UV-Vis spectrophotometer in reflection mode. The integration time was 300 ms.

In accordance with another exemplary embodiment, the as-obtained $Fe_3O_4$@p-$SiO_2$ core-shell colloids were separated from water by magnet and dried in air. Then the colloids were transferred to a solution of 0.5 mL n-octadecyltrimethoxysilane (ODTMS) in 24 mL 1,2-dichlorobenzene (DCB). The mixture was stirred at 120° C. for approximately 3 hours to allow the hydrolyzable alkoxy groups of the organosilanes to attack the surface silanols through an alcoholysis reaction. After cleaning with toluene 3 times by centrifugation, the modified $Fe_3O_4$@p-$SiO_2$@ODTMS colloids were dispersed in 3 mL DCB. 24 mg AOT was added in solution to facilitate the charge separation. The modified magnetic photonic crystals obtained by this method achieve self-assembly in nonpolar solution such as 1,2-dichlorobenzene, toluene, chloroform, and hexane. For example, the modified photonic crystals obtained showed broader tuning range, higher diffraction intensity compared to that in the $Fe_3O_4$@$SiO_2$@ODTMS system, and long-term stability.

Where methods described above indicate certain events occurring in certain order, the ordering of certain events may be modified. Moreover, while a process depicted as a flowchart, block diagram, etc., may describe the operations of the system in a sequential manner, it should be understood that many of the system's operations can occur concurrently.

Thus, the breadth and scope of exemplary embodiments of the disclosed system should not be limited by any of the above-described embodiments but should be defined only in accordance with the following claims and their equivalents.

What is claimed is:

1. A method of stabilizing electrostatically charged magnetic particles, comprising:
   coating electrically charged magnetic particles with a protective layer by directly depositing a layer of silica through a sol-gel process on a surface of the electrically charged magnetic particles;
   etching the protective layer of silica in water to produce a porous protective layer of silica on the electrically charged magnetic particles;

dispersing a plurality of the electrically charged magnetic particles with the porous protective layer of silica in a polar solution; and assembling the plurality of the electrically charged magnetic particles with the porous protective layer of silica under an external magnetic field into periodic structures with tunable photonic properties in the polar solution.

2. The method of claim 1, wherein the electrically charged magnetic particles are superparamagnetic.

3. The method of claim 1, wherein the porous protective layer has mesoscale porosity and enhanced permeability to solvents and ions.

4. The method of claim 3, wherein the porous protective layer prevent polyelectrolytes from detaching from the superparamagnetic particles and allows the charge dissociation of polyelectrolytes and produces strong electrostatic interactions among the superparamagnetic particles; and wherein the porous protective layer enhances the charge stability and maintains long-range repulsions, which allows for self-assembly of the periodic structures.

5. The method of claim 1, comprising:
coating the electrically charged magnetic particles with a layer of a cross-linked polystyrene; and
etching a surface of the cross-linked polystyrene layer of the superparamagnetic particles in toluene and/or chloroform to produce a porous protective layer on the surface of the superparamagnetic particles.

6. The method of claim 1, wherein the etching the protective layer of silica in the water produces mesopores and micropores within the layer of the silica, the mesopores comprise pores of greater than approximately 2 nm, and the micropores comprise pores of less than approximately 2 nm.

7. The method of claim 1, comprising:
performing a post-treatment process, which partially removes materials from the protective layer to create porosity.

8. The method of claim 2, comprising:
synthesizing superparamagnetic particles in water and coating the particles with the layer of silica;
washing the coated superparamagnetic particles with ethanol and water to remove excess ammonia and water;
heating the superparamagnetic particles in distilled water;
cleaning the superparamagnetic particles with water; and
dispersing the superparamagnetic particles in distilled water.

9. The method of claim 2, comprising:
controlling porosity of the porous protective layer on the superparamagnetic particles based on a duration of etch time.

10. A method of stabilizing electrostatically charged magnetic particles, comprising:
coating electrically charged magnetic particles with a protective layer, wherein the electrically charged magnetic particles are superparamagnetic particles; and
etching a surface of the protective layer of the superparamagnetic particles in toluene and/or chloroform to produce a porous protective layer on the surface of the superparamagnetic particles.

11. The method of claim 10, comprising:
coating the superparamagnetic particles with a layer of silica by directly depositing a layer of silica through a sol-gel process on a surface of the superparamagnetic particles;
etching the silica coated particles in a base solution to produce mesoscale porosity in the protective layer, which stabilizes the charges on the superparamagnetic particles; and
enhancing the electrostatic repulsion by facilitating the charge dissociation of polyelectrolytes underneath the protective layer to form a high density of negative charges.

12. The method of claim 10, further comprising:
coating the superparamagnetic particles with a layer of silica by directly depositing a layer of silica through a sol-gel process on a surface of the superparamagnetic particles; and
etching the protective layer of silica in water to produce a porous protective layer of silica on the electrically charged magnetic particles.

13. The method of claim 10, wherein the protective layer is a cross-linked polystyrene.

14. A method of stabilizing electrostatically charged magnetic particles, comprising:
coating surfaces of electrically charged magnetic particles with a protective layer of a polymer by directly depositing the protective layer of polymer on the electrically charged magnetic particles surface through an emulsion polymerization process;
post-treating the surfaces of the electrically charged magnetic particles to produce micropores and mesoscale pores within the protective polymer layer, wherein the post-treating comprises etching the protective layer of polymer in a nonpolar solvent to produce the micropores and mesopores within the protective layer;
dispersing a plurality of the electrically charged magnetic particles with the porous protective layer of polymer in a polar solution; and
assembling the plurality of the electrically charged magnetic particles with the micropores and the mesopores within the protective layer of polymer under an external magnetic field into periodic structures with tunable photonic properties in the polar solution.

15. The method of claim 14, wherein the electrically charged magnetic particles are charged superparamagnetic particles.

16. The method of claim 15, comprising:
depositing the protecting layer on the superparamagnetic particles through an emulsion polymerization, the emulsion polymerization includes depositing a slightly cross-linked polymer layer on the surfaces of the superparamagnetic particles.

17. The method of claim 15, wherein the micropores and mesoscale pores prevent polyelectrolytes from detaching from the electrically charged magnetic particles and allows the polyelectrolytes to ionize and produces strong electrostatic interactions among the electrically charged magnetic particles; and wherein the micropores and mesoscale pores enhance the charge stability and maintain long-range repulsions for self-assembly of the periodic structures.

18. The method of claim 14, wherein the mesoscale pores within the layer of polymer comprises pores of greater than approximately 2 nm, and the micropores have a diameter of less than approximately 2 nm.

19. The method of claim 14, wherein the protective layer is a cross-linked polystyrene.

20. The method of claim 14, wherein the nonpolar solution is 1,2-dichlorobenzene, toluene, chloroform, or hexane.

* * * * *